United States Patent [19]

Grogan

[11] Patent Number: 5,402,689
[45] Date of Patent: Apr. 4, 1995

[54] NONTHREADED LOAD SENSING PROBE

[75] Inventor: Richard J. Grogan, Perrysburg, Ohio

[73] Assignee: Helm Instrument Co., Inc., Maumee, Ohio

[21] Appl. No.: 147,828

[22] Filed: Nov. 4, 1993

[51] Int. Cl.$^6$ .............................................. G01L 1/22
[52] U.S. Cl. ................... 73/862.635; 73/768; 73/862.06; 73/862.541
[58] Field of Search .................... 73/862.541, 862.631, 73/862.632, 862.635, 862.06, 796, 768, 774, 781, 151–153; 166/138, 139, 211, 216, 217

[56] References Cited

U.S. PATENT DOCUMENTS

| | | | |
|---|---|---|---|
| 1,547,025 | 7/1925 | Callahan | 166/216 |
| 3,115,189 | 12/1963 | Althouse, Jr. et al. | 166/138 |
| 3,388,590 | 6/1968 | Dryden | 73/774 X |
| 3,444,390 | 5/1969 | Breidenbach et al. | 307/116 |
| 3,695,096 | 10/1972 | Kutsay | 73/862.631 X |
| 4,171,646 | 10/1979 | Dybel et al. | 73/808 |
| 4,280,363 | 7/1981 | Johansson | 73/768 |
| 4,342,233 | 8/1982 | Edmondson et al. | 73/862.06 |
| 4,412,456 | 11/1983 | Wilhelm et al. | 73/768 X |
| 4,429,579 | 2/1984 | Wilhelm | 73/768 |
| 4,526,044 | 7/1985 | Moser et al. | 73/862.06 |
| 4,576,053 | 3/1986 | Hatamura | 73/862.631 X |
| 4,732,212 | 3/1988 | Fraser, III | 166/217 |
| 4,800,760 | 1/1989 | Wolfer et al. | 73/862.06 X |

Primary Examiner—Richard E. Chilcot, Jr.
Assistant Examiner—Elizabeth L. Dougherty
Attorney, Agent, or Firm—Howard & Howard

[57] ABSTRACT

An apparatus for sensing forces applied to a structure includes a generally cylindrical body having a pair of end portions and a smaller diameter intermediate portion with a central aperture extending longitudinally through the body. The end portions are slotted to form radially outwardly translatable legs for engaging a wall of a cavity formed in the structure. Strain gauges are attached to the intermediate portion for sensing forces applied to the structure when the body is positioned in the cavity and the legs are engaging the wall of the cavity. The wall of the central aperture has a pair of threaded sections for threadably receiving bushing and bearing assemblies inserted from opposite ends of the central aperture. Each of the assemblies has a tapered surface for radially outwardly translating the legs. One of the assemblies has an allen wrench receiving cavity accessible through one of the open ends of the central aperture and the other one of assemblies has an allen wrench receiving cavity accessible from outside the body.

16 Claims, 2 Drawing Sheets

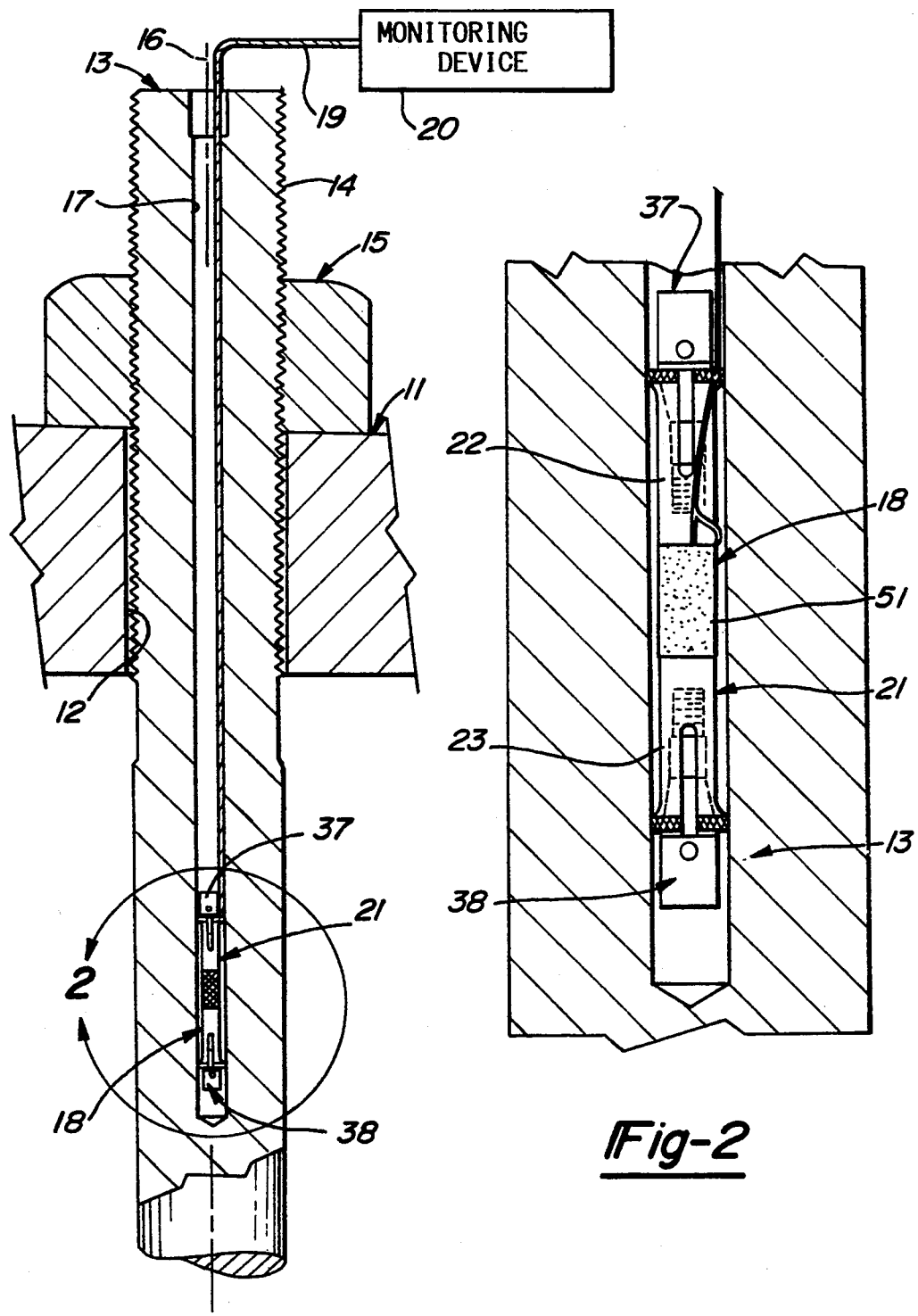

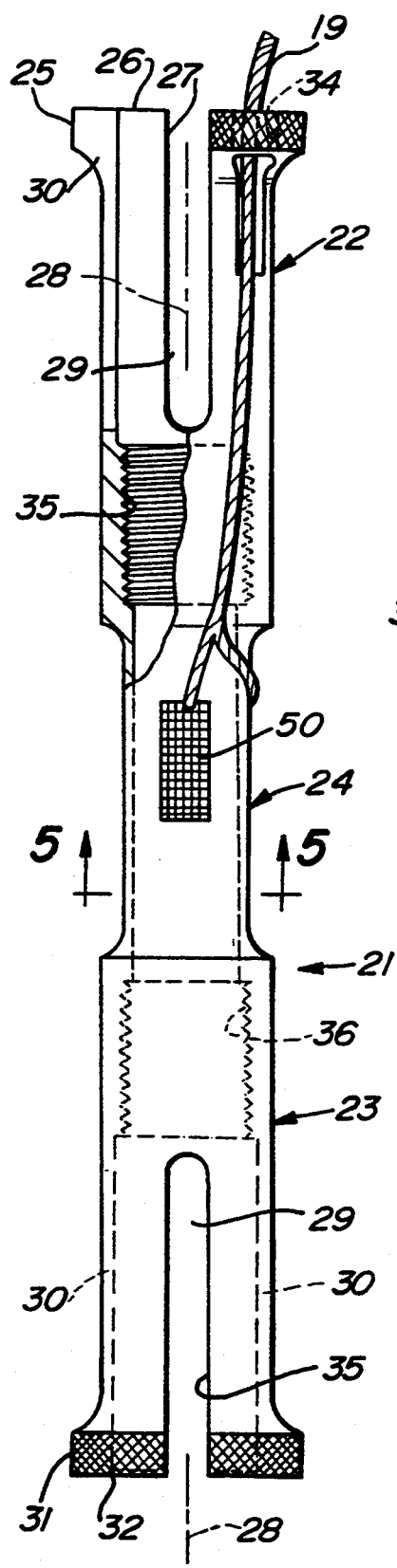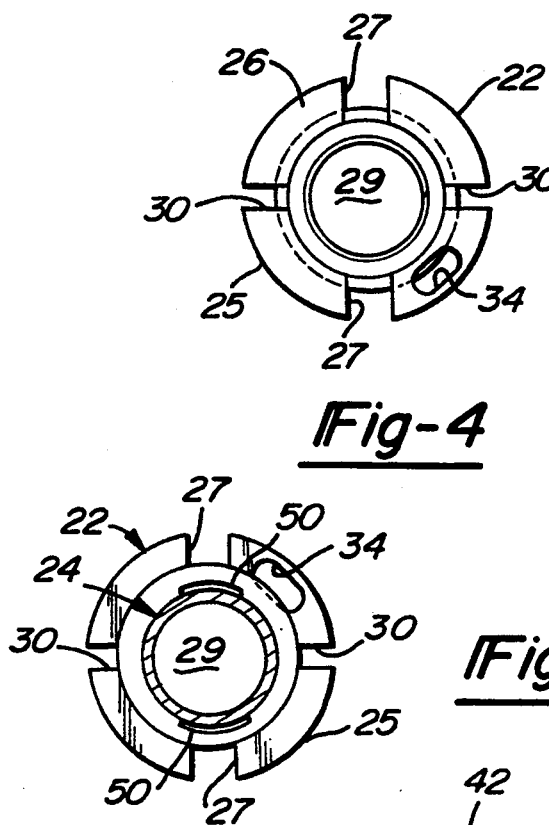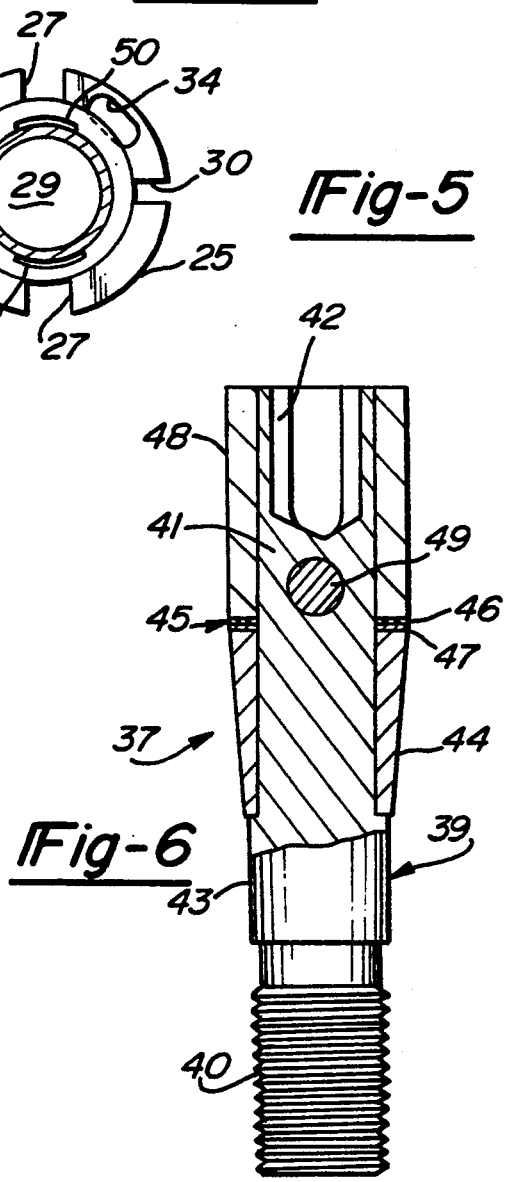

NONTHREADED LOAD SENSING PROBE

BACKGROUND OF THE INVENTION

The present invention relates generally to force sensing transducers and, in particular, to a nonthreaded load sensing probe for measuring the work forces present in machines.

The ability to measure force or load is a vital part of many industrial processes. Recognizing that a structure undergoes a dimensional change when subjected to a load, a measure of the dimensional change in a structure can accurately indicate the amount of load or force applied thereto. Such measurement is usually made through the use of a wire, foil, or semiconductor element intimately bonded to the structure. By measuring the change in the electrical resistance of the element, which resistance is a function of the change in cross-section of the element due to alterations of a structure, it is possible to accurately measure the load applied to the structure.

Many transducer devices have been developed for attachment to structures for measuring the amount of stress applied thereto. The U.S. Pat. No. 3,444,390 to Breidenbach et al. and the U.S. Pat. No. 4,171,646 to Dybel et al. both disclose measuring devices for use on machine tools such as forges, presses and the like. Generally, such prior art devices are not sufficiently sensitive or physically constructed to be readily adaptable for use in areas of a machine near the tool in order to directly measure forces on the tool. For example, the transducer arrangements disclosed in the above-mentioned patents are incapable of directly measuring the working load on a tool. This inability to directly measure tool loading is a particularly acute problem when it is desired to monitor the individual loads on a plurality of tools carried on a common base and caused to do work simultaneously.

Ideally, the apparatus for measuring the work forces in a machine tool may be mounted substantially or totally in a machine so that it is protected from physical damage resulting from inadvertent impact or from contamination by debris or lubricants. It is also desirable that the load measuring apparatus be accessible for removal, inspection, maintenance or repair.

The U.S. Pat. No. 4,280,363 issued to Johansson shows a measuring shaft adapted to be fixed in a hole formed in an object to be measured. The shaft is equipped with strain gauges or similar devices for sensing a load and the inner end of the shaft is threaded to engage with threads provided in the bottom of the hole. The outer end of the shaft is fixed in relation to the hole so that the shaft, like a part unseparated from the walls of the hole but nevertheless detachable, accompanies the motions of the hole.

The U.S. Pat. No. 4,412,456 issued to Wilhelm et al. shows a load sensing probe which has a split plug including a slot defining two sensing arms, which arms are pushed outwardly into the engagement with an accommodating cavity formed in a back-up member of a machine tool. The probe is sensitive to relatively closing movement of the cavity caused by the compressive strain in the back-up member.

The U.S. Pat. No. 4,429,579 issued to Wilhelm shows a tie rod load sensor for a die-casting or other machine which has an axially extending bore formed in the tie rod to receive a strain gauge sensing member. One end of the sensing member is countersunk to receive a ball which concentrates the load when it is forced against the bottom of the bore by a bolt threaded into the opening of the bore. The sensing member includes a narrow central shaft portion upon which a plurality of strain gauges are mounted. The bolt is utilized to preload the sensing member such that the strain gauges mounted thereon will measure changes in the tension in the tie rod.

The U.S. Pat. No. 4,526,044 issued to Moser, et at. shows a load sensing probe for disposition in a cavity in a back-up member. A centrally disposed bore extends through a generally cylindrical body member having first and second end regions of substantially equal outside diameter and a third intermediate region of reduced diameter. A first pair of slots extend axially inwardly into the intermediate region and a second pair of slots extend from the second region into the intermediate region and are disposed at a right angle to the first pair of slots. A threaded rod having a frusto-conical surface extends through the centrally disposed bore and includes a threaded fastener. This assembly may be utilized to apply outwardly directed forces to the body of the probe and retain it within the cavity of the tool. Strain gauges are secured on a radially extending surface of one of the end regions and measure the dimensional change of the cavity. Opposed flats on the opposite end of the body member permit rotation of the body member in the cavity during installation.

SUMMARY OF THE INVENTION

The present invention concerns an apparatus for sensing forces applied to a structure such as a machine element. The apparatus is in the form of a nonthreaded load sensing probe which includes a generally cylindrical body having a pair of end portions extending from opposite end surfaces thereof, an intermediate portion having a smaller outside diameter than an outside diameter of either of the end portions and extending between the end portions, and a central aperture extending along a longitudinal axis of the body and having an open end at each of the opposite end surfaces. Radially outwardly translatable engaging means including a radially outwardly extending circumferential flange are formed in each of the end portions for engaging a wall of a cavity formed in the machine element. The engaging means are formed as legs between adjacent ones of four slots extending along the longitudinal axis from an associated one of the end surfaces toward the intermediate portion and from an outer surface of the end portion to the central aperture. One pair of the slots can be wider than the other pair of slots. Force sensing means such as strain gauges are attached to the intermediate portion for sensing forces applied to the machine element when the body is positioned in the cavity and the legs are engaging the wall of the cavity.

A wall of the central aperture has a threaded section formed in each of the end regions for receiving a pair of means for radially outwardly translating the engaging means. Each of the means for translating includes a bushing and bearing assembly having threads formed thereon for threadably engaging an associated one of the threaded sections and a tapered surface tapering from a first diameter larger than a diameter of the central aperture at an associated open end thereof and a second diameter smaller than a diameter of the central aperture at the associated open end thereof. The bushing and bearing assembly has a generally cylindrical assembly body with the threads formed at one end and an opposite end, an enlarged portion formed between the threads and the opposite end, and a tapered cone having an aperture formed therein for receiving the opposite end of the assembly body and the tapered surface formed thereon.

The bushing and bearing assembly also includes a bearing washer and a bushing collar, the bearing washer and the bushing collar each having an aperture formed therein for receiving the opposite end of the assembly body, the tapered cone being positioned between the enlarged portion and the bearing washer and the bearing washer being positioned between the tapered cone and the bushing collar. The bearing washer can be formed of a ting of fiber material and a metal backing ting. The bushing and bearing assembly further includes a pin extending through transverse apertures formed in the assembly body and the bushing collar for retaining the tapered cone, the bearing washer and the bushing collar on the assembly body. One of the assembly bodies has an allen wrench cavity formed in the threaded end accessible through one of the open ends of the central aperture, and the other assembly body has an allen wrench cavity formed in the opposite end accessible from outside the probe body.

It is an object of the present invention to provide a sensor for sensing forces applied to a structure or a machine element in which tension and/or compression forces are generated.

Another object of the present invention is to provide a sensor for sensing tension forces in tie rods or tie bars of metal die cast machines and plastic injection molding machines.

A further object of the present invention is to provide a sensor for sensing tension forces in column tie rods or column structures of metal working presses such as stamping, forging, coldforming, assembly, etc.

Another object of the present invention is to provide a sensor for sensing tension and compression forces in tool elements (such as punches, dies, etc.) or tool support structures (such as punch or die holders, die shoes, bolsters, etc.) for metal working, metal die cast and plastic injection molding tools.

A further object of the present invention is to provide a sensor for sensing tension and compression forces in drive system components (such as pitmans, connecting rods, drive links, guided plungers, etc.) of metal working, metal die cast and plastic injection molding machines.

Another object of the present invention is to provide a sensor for sensing tension and compression forces in robotic arms and linkages such as are used in the lifting, manipulation, positioning and clamping of various manufactured parts and assemblies.

It is an object of the present invention to provide a sensor which allows for calibration to an actual force applied to a structure involving the use of calibration load cells or other calibrated force readout devices to verify the actual force applied during calibration.

It is another object of the present invention to provide a sensor which allows for a "calculated" calibration based upon the output of the sensor under a test loading condition, and knowledge of the mechanical strength parameters of the structure material and the structure cross-sectional area of the sensor location.

BRIEF DESCRIPTION OF THE DRAWINGS

The above, as well as other advantages of the present invention, will become readily apparent to those skilled in the art from the following derailed description of a preferred embodiment when considered in the light of the accompanying drawings in which:

FIG. 1 is a cross-sectional view of a portion of a machine having a nonthreaded load sensing probe in accordance with the present invention mounted in a cavity;

FIG. 2 is an enlarged view of the probe shown in the FIG. 1;

FIG. 3 is an elevation view of the body of the probe shown in the FIG. 2 partially cut away;

FIG. 4 is an end view of the probe body shown in the FIG. 3;

FIG. 5 is a cross-sectional view of the probe body taken along the line 5—5 in the FIG. 3; and FIG. 6 is a cross-sectional view of one of the bushing and bearing assemblies shown in the FIG. 2.

DESCRIPTION OF THE PREFERRED EMBODIMENT

There is shown in the FIG. 1 a machine platen 11 having an aperture 12 formed therein. A tie bar 13 has a plurality of threads 14 formed on one end thereof and extends through the aperture 12. A tie bar nut 15 threadably engages the threads 14 and abuts a surface of the machine platen 11. The tie bar 13 is representative of any structure or machine element in which tension and/or compression forces are generated. Such machine elements, for example, include: tie rods or tie bars of metal die cast machines and plastic injection molding machines in which tension forces are developed; column tie rods or column structures of metal working presses (such as stamping, forging, coldforming, assembly, etc.) in which tension forces are developed; tool elements (such as punches, dies, etc.) or tool support structures (such as punch or die holders, die shoes, bolsters, etc.) for metal working, metal die cast and plastic injection molding tools in which tension and compression forces are developed; drive system components (such as pitmans, connecting rods, drive links, guided plungers, etc.) of metal working, metal die cast and plastic injection molding machines in which tension and compression forces are developed; and robotic arms and linkages (such as are used in the lifting, manipulation, positioning and clamping of various manufactured parts and assemblies) in which tension and compression forces are developed.

The tie bar 13 has a longitudinal axis 16 along which a cavity 17 is formed. The cavity 17 has an open end at the threaded end of the tie bar 13 and has a closed end on the opposite side of the machine platen 11 from the tie bar nut 15. A nonthreaded load sensing probe 18, in accordance with the present invention, is positioned adjacent the closed end of the cavity 17. An electrical cable 19 has one end connected to the probe 18 and extends out of the open end of the cavity 17 with an opposite end connected to a monitoring device 20.

In order to generate a signal representing a force measurement from the probe 18, the cavity 17 is drilled into an active deflection or strain region of the structure (tie bar 13) in which the measurement is desired to be made. The cavity 17 is aligned axially with the applied force and the resultant deflection in the tie bar 13. The probe 18 is then installed into the cavity 17 in the active deflection region. The operating principal of the probe 18 relies on its ability to be secured in place by translating each end radially outwardly into intimate contact with the wall surface of the cavity 17. As the tie bar 13 deflects under an applied axial load oriented generally parallel to the longitudinal axis 16 of the tie bar 13 and the longitudinal axis of the cavity 17, the cavity and the intimately secured probe 18 also undergo an axial deflection. The axial deflection of the probe 18, as transmitted to a smaller center portion with strain sensing elements attached as described below, results in a force output signal proportional to the force applied to the tie bar 13.

The force output signal from the probe 18 is proportional to the applied force which allows for the calibration of the probe to an actual force applied to the tie bar 13. This allows for conventional "field calibration" of the structure involving the use of calibration load cells or other calibrated force readout devices to verify the actual force applied during calibration. Depending upon the particular structure in which the sensor is installed, a "calculated" calibration may also be used. This eliminates the need for using calibration load cells in a "field calibration". Rather, based upon the output of the probe 18 under a test loading condition, and knowing the mechanical strength parameters of the structure material and the structure cross-sectional area of the sensor location, a "Calculated Calibration" formula can be used to accurately relate the sensor output to the force applied to the structure.

The probe 18 of the FIG. 1 is shown enlarged in the FIG. 2. The probe 18 includes a generally cylindrical elongated body 21 which is shown in more detail in the FIGS. 3 through 5. The probe body 21 has a first larger diameter end portion 22 joined with a second larger diameter end portion 23 by a smaller diameter intermediate portion 24. A free end of the first end portion 22 has a radially outwardly extending circumferential flange 25 formed thereon. The flange 25 has a knurled periphery and forms an outwardly facing end surface 26 at the free end of the first end portion 22. Two larger width slots 27 are formed in the first end portion 22 and extend from the end surface 26 toward the smaller diameter intermediate portion 24. The body 21 has a longitudinal axis 28 along which is formed a central aperture 29 extending from an open end at the end surface 26 to an opposite open end at the free end of the second end portion 23. As best shown in the FIG. 4, the slots 27 are diametrically opposed and extend from an outer surface of the first end portion 22 to the central aperture 29. Two smaller width slots 30 are formed in the first end portion 22 diametrically opposed to one another. The slots 30 extend from the end surface 26 toward the intermediate portion 24 and from the outer surface of the first end portion 22 to the central aperture 29. The slots 27 and 30 are generally equally spaced about the longitudinal axis 28 thereby dividing the first end portion 22 into four radially outwardly translatable legs.

The second end portion 23 has a similar construction to the first end portion 22. A circumferential radially outwardly extending flange 31 is formed at the free end of the second portion 23 and defines an end surface 32. The central aperture 29 extends along the longitudinal axis 28 to the end surface 32. Two wider width slots 33 are formed diametrically opposite one another in the second end portion 23. Two similar diametrically opposed smaller width slots 30 are formed in the second end portion 23 with the slots being equally spaced about the longitudinal axis 28. However, the slots can be of any suitable width and all of the slots can be the same width. The periphery of the flange 31 is knurled.

As best shown in the FIG. 4, an aperture 34 is formed from the end surface 26 through the flange 25 to provide a path for the cable 19 as will be explained below. The wall of the central aperture 29 includes a threaded section 35 formed between the closed ends of the slots 27 and 30 and the intermediate portion 24. The wall of the central aperture 29 has a similar threaded section 36 formed between the closed ends of the slots 33 and the intermediate portion 24.

As shown in the FIG. 2, the probe 18 also includes a bushing and bearing assembly 37 which extends into the open end of the central aperture 29 at the first end portion 22 for forcing the legs formed therein radially outwardly thereby engaging the knurled periphery of the flange 25 with the wall of the cavity 17. A similar bushing and bearing assembly 38 extends into the open end of the central aperture 29 at the second end portion 23 for radially outwardly translating the legs and forcing the flange 31 into abutment with the wall of the cavity 17.

There is shown in the FIG. 6, in cross section, the bushing and bearing assembly 37. The assembly 37 includes a generally cylindrical elongated body 39 which can be formed from a suitable fastener such as a set screw. The body 39 has a threaded end 40 and an opposite end 41 in which is formed a hexagonal cross section cavity 42. Formed between the threaded end 40 and the opposite end 41 is an enlarged intermediate portion 43 of the body 39. The assembly 37 also includes a tapered cone 44 which has an aperture formed longitudinally therethrough. The tapered cone 44 has a larger diameter end which is larger in diameter than the open end of the central aperture 29 and is truncated at a smaller diameter end which is smaller in diameter than the open end of the central aperture 29. The tapered cone 44 slides over the opposite end 41 of the body 39 until the smaller diameter end of the tapered cone 44 abuts the enlarged diameter portion 43. The assembly 37 further includes a bearing washer 45 formed of a ring of fiber material 46 attached to a metal backing ring 47. The bearing washer 45 slides over the opposite end 41 of the body 39 with the metal backing ring 47 abutting the larger diameter end of the tapered cone 44. A generally tubular bushing collar 48 is then installed on the opposite end 41 abutting the fiber material ting 46. A pin 49 is pressed into transverse apertures formed in both the bushing collar 48 and the opposite end 41 of the body 39 to retain the tapered cone 44, the bearing washer 45 and the bushing collar 48 on the body 39. The bushing and bearing assembly 38 is formed in a similar manner. However, the hexagonal cavity 32 is formed in the threaded end 40 of the assembly 38.

Referring to the FIG. 3, there is shown one of a plurality of force sensing means such as conventional strain gauges 50 which are attached to an external surface of the intermediate portion 24. One end of the cable 19 is inserted through the cable aperture 34 from the end surface 26 and is connected to the strain gauges 50. After the strain gauges 50 are attached to the body 21 and connected to the cable 19, a potting compound 51 (as shown in the FIG. 2) is utilized to cover and protect the strain gauges 50 and their connection to the cable 19.

The nonthreaded load sensing probe 18 is installed in the tie bar 13 in the following manner. The elongated cavity 17 is formed in the tie bar 13. The bushing and bearing assembly 38 is inserted into the open end of the central aperture 29 at the second end portion 23 with the threaded end of the bushing and bearing assembly 38 threaded into initial engagement with the internally threaded section 36. When the probe 18 is located at the selected position in the cavity 17, adjacent the closed end thereof, a suitable tool such as an allen wrench is inserted into the cavity 17 and into the open end of the central aperture 29 at the first end portion 22. The allen wrench then is inserted into the hexagonal cavity formed in the facing threaded end of the bushing and bearing assembly 38 and the assembly 38 is rotated so as to draw the tapered cone 44 into engagement with the wall of the central aperture 29. As the assembly 38 is rotated, the legs of the second end portion 23 are radially outwardly translated until the knurled periphery of the flange 31 engages the wall of the cavity 17 thereby fixing the probe 18 in place. The allen wrench is removed and the bushing and bearing assembly 37 is inserted into the cavity 17 and into the open end of the central aperture 29 at the first end portion 22. The threaded end 40 of the assembly 37 is threaded into engagement with the internally threaded section 35 by inserting the allen wrench into the hexagonal cavity 42 and rotating the assembly 37. Continued rotation of the assembly 37 will draw the tapered cone 44 into engagement with the wall of the central aperture 29 thereby radially outwardly translating the legs of the first end portion 22 until the knurled periphery of the flange 25 engages the wall of the cavity 17. Now the probe is securely fixed in the cavity 17 for measuring forces developed in the tie bar 13.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for sensing forces applied to a structure comprising:
   a generally cylindrical body having a pair of end portions extending from opposite end surfaces thereof, an intermediate portion having a smaller outside diameter than an outside diameter of either of said end portions and extending between said end portions, and a central aperture extending along a longitudinal axis of said body and having an open end at each of said opposite end surfaces;
   radially outwardly translatable engaging means formed in each of said end portions for engaging a wall of a cavity formed in a structure;
   force sensing means attached to said intermediate portion for sensing forces applied to the structure when said body is positioned in the cavity and said engaging means are engaging the wall of the cavity;
   a wall of said central aperture having a threaded section formed in each of said end regions; and
   a pair of means for radially outwardly translating said engaging means into engagement with the wall of the cavity formed in the structure, one of said means for translating threadably engaging one of said threaded sections and having means for rotating said one means for translating accessible through one of said open ends of said central aperture, and another one of said means for translating threadably engaging another one of said threaded regions and having means for rotating said another means for translating accessible from outside said body.

2. The apparatus according to claim 1 wherein said engaging means includes a radially outwardly extending circumferential flange formed on each of said end portions.

3. The apparatus according to claim 1 wherein each of said end portions has at least two slots formed therein, said slots extending along said longitudinal axis from an associated one of said end surfaces toward said intermediate portion and from an outer surface of said end portion to said central aperture, and wherein said means for engaging includes legs formed in said end portion between said slots.

4. The apparatus according to claim 1 wherein each of said end portions has at four slots formed therein, said slots extending along said longitudinal axis from an associated one of said end surfaces toward said intermediate portion and from an outer surface of said end portion to said central aperture, and wherein said means for engaging includes legs formed in said end portion between said slots.

5. The apparatus according to claim 1 wherein said force sensing means includes a plurality of strain gauges.

6. The apparatus according to claim 1 wherein each of said means for translating includes a bushing and bearing assembly having threads formed thereon for threadably engaging an associated one of said threaded sections and a tapered surface tapering from a first diameter larger than a diameter of said central aperture at an associated open end thereof and a second diameter smaller than a diameter of said central aperture at said associated open end thereof.

7. The apparatus according to claim 6 wherein said bushing and bearing assembly includes a generally cylindrical assembly body having said threads formed at one end and an opposite end, an enlarged portion formed between said threads and said opposite end, and a tapered cone having an aperture formed therein for receiving said opposite end of said assembly body.

8. The apparatus according to claim 7 wherein said bushing and bearing assembly includes a bearing washer and a bushing collar, said bearing washer and said bushing collar each having an aperture formed therein for receiving said opposite end of said assembly body, said tapered cone being positioned between said enlarged portion and said bearing washer and said bearing washer being positioned between said tapered cone and said bushing collar.

9. The apparatus according to claim 8 wherein said bushing and bearing assembly includes a pin extending through transverse apertures formed in said assembly body and said bushing collar for retaining said tapered cone, said bearing washer and said bushing collar on said assembly body.

10. The apparatus according to claim 8 wherein said bearing washer is formed of a ring of fiber material and a metal backing ring.

11. The apparatus according to claim 1 wherein said means for rotating includes a hexagonal cross section cavity formed in each of said means for translating.

12. An apparatus for sensing forces applied to a structure comprising:
    a generally cylindrical body having a pair of end portions extending from opposite end surfaces thereof, an intermediate portion having a smaller outside diameter than an outside diameter of either of said end portions and extending between said end portions, and a central aperture extending along a longitudinal axis of said body and having an open end at each of said opposite end surfaces;

radially outwardly translatable engaging means formed in each of said end portions including a radially outwardly extending circumferential flange formed on each of said end portions for engaging a wall of a cavity formed in a structure;

force sensing means attached to said intermediate portion for sensing forces applied to the structure when said body is positioned in the cavity and said engaging means are engaging the wall of the cavity;

a wall of said central aperture having a threaded section formed in each of said end regions; and a pair of means for radially outwardly translating said engaging means into engagement with the wall of the cavity formed in the structure, each of said means for translating including a bushing and bearing assembly having threads formed thereon for threadably engaging an associated one of said threaded sections and a tapered surface tapering from a first diameter larger than a diameter of said central aperture at an associated open end thereof and a second diameter smaller than a diameter of said central aperture at said associated open end thereof, one of said means for translating having means for rotating said one means for translating accessible through one of said open ends of said central aperture, and another one of said means for translating having means for rotating said another means for translating accessible from outside said body.

13. A load sensing probe for sensing forces applied to a machine dement comprising:

a generally cylindrical body having a pair of end portions of substantially equal outside diameter extending from opposite end surfaces thereof, an intermediate portion having a smaller outside diameter than said outside diameter said end portions and extending between said end portions, and a central aperture extending along a longitudinal axis of said body and having an open end at each of said opposite end surfaces;

four slots formed in each of said end portions and extending along said longitudinal axis from an associated one of said end surfaces toward said intermediate portion and from an outer surface of said end portion to said central aperture, said end portions forming legs between adjacent ones of said slots, said legs being radially outwardly translatable for engaging a wall of a cavity formed in a machine element;

force sensing means attached to said intermediate portion for sensing forces applied to the machine dement when said body is positioned in the cavity and said legs are engaging the wall of the cavity;

a wall of said central aperture having a threaded section formed in each of said end regions; and a pair of means for radially outwardly translating said engaging means into engagement with the wall of the cavity formed in the structure, one of said means for translating threadably engaging one of said threaded sections and having means for rotating said one means for translating accessible through one of said open ends of said central aperture, and another one of said means for translating threadably engaging another one of said threaded regions and having means for rotating said another means for translating accessible from outside said body.

14. The apparatus according to claim 13 wherein each said means for translating includes a generally cylindrical assembly body having threads formed at one end and an opposite end, an enlarged portion formed between said threads and said opposite end, a tapered cone having an aperture formed therein for receiving said opposite end of said assembly body, said tapered cone having a tapered surface tapering from a first diameter larger than a diameter of said central aperture at an associated open end thereof and a second diameter smaller than a diameter of said central aperture at said associated open end thereof, a bearing washer and a bushing collar, said bearing washer and said bushing collar each having an aperture formed therein for receiving said opposite end of said assembly body, said tapered cone being positioned between said enlarged portion and said bearing washer and said bearing washer being positioned between said tapered cone and said bushing collar.

15. The apparatus according to claim 14 wherein said means for translating includes a pin extending through transverse apertures formed in said assembly body and said bushing collar for retaining said tapered cone, said bearing washer and said bushing collar on said assembly body.

16. The apparatus according to claim 14 wherein said means for rotating includes a hexagonal cross section cavity formed in said threaded end of said assembly body of said one of said means for translating and a hexagonal cross section cavity formed in said opposite end of said assembly body of said another one of said means for translating.

* * * * *